US010378896B2

(12) United States Patent
Birnie

(10) Patent No.: US 10,378,896 B2
(45) Date of Patent: Aug. 13, 2019

(54) METHOD AND SYSTEM FOR PLANNING THE PATH OF AN AGRICULTURAL VEHICLE

(75) Inventor: Denis Allan Birnie, Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 1902 days.

(21) Appl. No.: 11/363,839

(22) Filed: Feb. 27, 2006

(65) Prior Publication Data

US 2009/0118904 A1    May 7, 2009

(51) Int. Cl.
*G01C 21/00* (2006.01)
*A01B 69/04* (2006.01)
*G05D 1/02* (2006.01)

(52) U.S. Cl.
CPC ........... *G01C 21/00* (2013.01); *A01B 69/008* (2013.01); *G05D 1/0278* (2013.01); *G05D 1/027* (2013.01); *G05D 2201/0201* (2013.01)

(58) Field of Classification Search
CPC ... B62D 1/22; B62D 1/28; B62D 5/00; B62D 5/003; B62D 5/04; B62D 5/32; B62D 49/00; B62H 25/04; A01B 69/008; G05D 1/0274; G05D 1/0278; G05D 1/027; G05D 2201/0201; G01C 21/00
USPC ...... 180/6.62, 419, 444; 280/93.502, 93.503, 280/93.51; 318/587; 701/23, 41, 43, 50
See application file for complete search history.

(56) References Cited

U.S. PATENT DOCUMENTS

| | | | |
|---|---|---|---|
| 4,860,844 A * | 8/1989 | O'Neil ........................... 180/402 |
| 5,330,021 A * | 7/1994 | Beer ........................ B62D 1/04 180/400 |
| 5,334,987 A * | 8/1994 | Teach ............................. 701/214 |
| 5,492,348 A * | 2/1996 | Shaw et al. .................... 180/413 |
| 5,835,870 A * | 11/1998 | Kagawa .......................... 701/23 |
| 5,928,309 A * | 7/1999 | Korver ................. G01C 21/165 342/359 |
| 5,974,348 A * | 10/1999 | Rocks ....................... G01S 1/70 348/120 |
| 6,064,931 A * | 5/2000 | Sawada et al. .................. 701/41 |
| 6,170,600 B1 * | 1/2001 | Shimizu ........................ 180/446 |
| 6,236,924 B1 * | 5/2001 | Motz et al. ..................... 701/50 |
| 6,279,675 B1 * | 8/2001 | Bohner et al. ................ 180/403 |
| 6,394,218 B1 * | 5/2002 | Heitzer ......................... 180/402 |
| 6,442,462 B1 * | 8/2002 | Nishizaki et al. .............. 701/41 |
| 6,564,739 B2 * | 5/2003 | Doetsch ........................ 114/150 |
| 6,580,989 B1 * | 6/2003 | Husain et al. .................. 701/41 |
| 6,609,052 B2 * | 8/2003 | Radamis et al. ................ 701/41 |
| 6,650,979 B1 * | 11/2003 | Kreft ............................. 701/41 |
| 6,655,709 B2 * | 12/2003 | Sherwin et al. .............. 280/402 |
| 6,681,165 B2 * | 1/2004 | Shibasaki et al. ............. 701/41 |
| 6,687,579 B2 * | 2/2004 | Thompson et al. ............ 701/21 |
| 6,694,260 B1 * | 2/2004 | Rekow ................. G01C 21/165 280/5.5 |

(Continued)

FOREIGN PATENT DOCUMENTS

JP    2006213094 A   *   8/2006

*Primary Examiner* — Thomas G Black
*Assistant Examiner* — Sze-Hon Kong
(74) *Attorney, Agent, or Firm* — Kilpatrick Townsend & Stockton

(57) ABSTRACT

Embodiments of the present invention pertain to methods and systems for planning the path of an agricultural vehicle. In one embodiment, a first point of a first planned path and a second point of a second planned path are determined. A path plan is then automatically generated connecting the first point and the second point.

17 Claims, 8 Drawing Sheets

(56) References Cited

U.S. PATENT DOCUMENTS

| | | | |
|---|---|---|---|
| 6,763,907 B2 * | 7/2004 | Ueno et al. | 180/444 |
| 6,789,014 B1 * | 9/2004 | Rekow | G01C 21/165 180/9.38 |
| 6,807,471 B2 * | 10/2004 | Fujimori | 701/41 |
| 6,842,678 B2 | 1/2005 | Husain et al. | |
| 6,871,127 B2 * | 3/2005 | Dominke | B62D 5/0493 180/422 |
| 6,871,717 B2 * | 3/2005 | Kada | 180/167 |
| 6,876,920 B1 * | 4/2005 | Mailer | A01B 69/00 342/457 |
| 6,907,333 B2 * | 6/2005 | Iwazaki | 701/41 |
| 6,907,336 B2 * | 6/2005 | Gray et al. | 701/50 |
| 6,913,109 B2 * | 7/2005 | Kodama et al. | 180/446 |
| 6,929,086 B1 * | 8/2005 | Husain et al. | 180/413 |
| 6,984,071 B2 * | 1/2006 | Landrieve | 384/448 |
| 7,004,279 B2 * | 2/2006 | Shitamitsu et al. | 180/402 |
| 7,007,769 B2 * | 3/2006 | Hara et al. | 180/402 |
| 7,142,956 B2 * | 11/2006 | Heiniger | G05D 1/027 180/9.1 |
| 7,200,490 B2 * | 4/2007 | Lange et al. | 701/209 |
| 7,222,008 B2 * | 5/2007 | Takahashi et al. | 701/41 |
| 7,233,683 B2 * | 6/2007 | Han | G01S 19/48 340/995.25 |
| 7,263,422 B2 * | 8/2007 | Lange et al. | 701/50 |
| 7,306,072 B2 * | 12/2007 | Bohm et al. | 180/446 |
| 7,313,404 B2 * | 12/2007 | Anderson | G01C 21/28 455/456.1 |
| 7,337,872 B2 * | 3/2008 | Bohm et al. | 180/446 |
| 7,349,779 B2 * | 3/2008 | Nelson | 701/41 |
| 7,431,117 B2 * | 10/2008 | Ito | 180/204 |
| 7,451,030 B2 * | 11/2008 | Eglington et al. | 701/50 |
| 7,593,798 B2 * | 9/2009 | Han | A01B 69/008 701/411 |
| 7,610,150 B1 * | 10/2009 | Martin et al. | 701/209 |
| 7,721,830 B2 * | 5/2010 | Dunn et al. | 180/6.48 |
| 7,849,956 B2 * | 12/2010 | Khalil et al. | 180/418 |
| 2002/0017087 A1 * | 2/2002 | Dillon | 56/14.6 |
| 2004/0039508 A1 * | 2/2004 | Husain et al. | 701/41 |
| 2004/0193348 A1 * | 9/2004 | Gray et al. | 701/50 |
| 2005/0279563 A1 * | 12/2005 | Peterson | 180/414 |
| 2006/0015251 A1 * | 1/2006 | Lange et al. | 701/213 |
| 2006/0064216 A1 * | 3/2006 | Palmer | 701/41 |
| 2006/0089770 A1 * | 4/2006 | Ito | 701/41 |
| 2006/0119474 A1 * | 6/2006 | Requejo et al. | 340/438 |
| 2006/0261572 A1 * | 11/2006 | Biondi et al. | 280/432 |
| 2007/0198159 A1 * | 8/2007 | Durkos et al. | 701/50 |

* cited by examiner

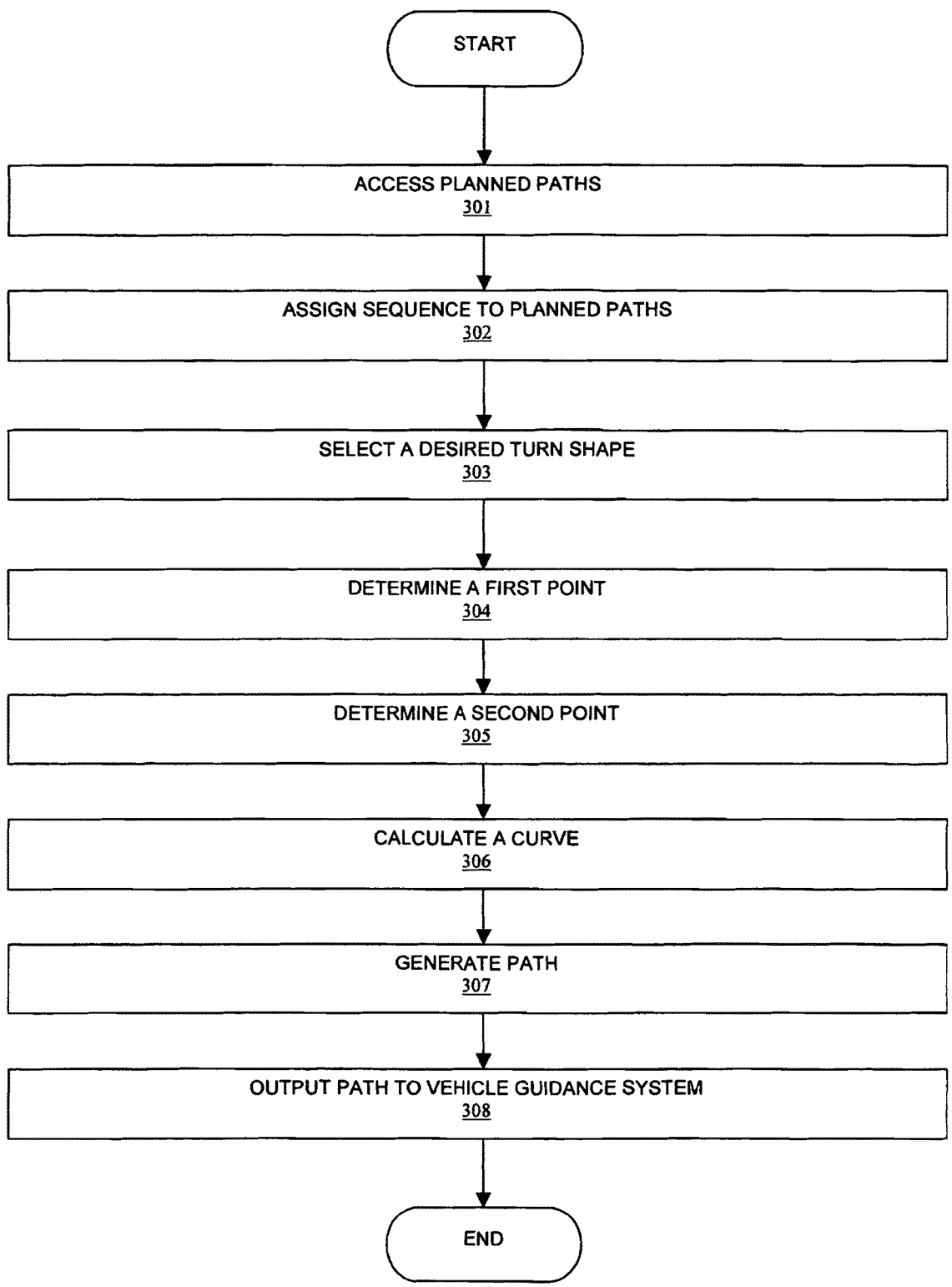

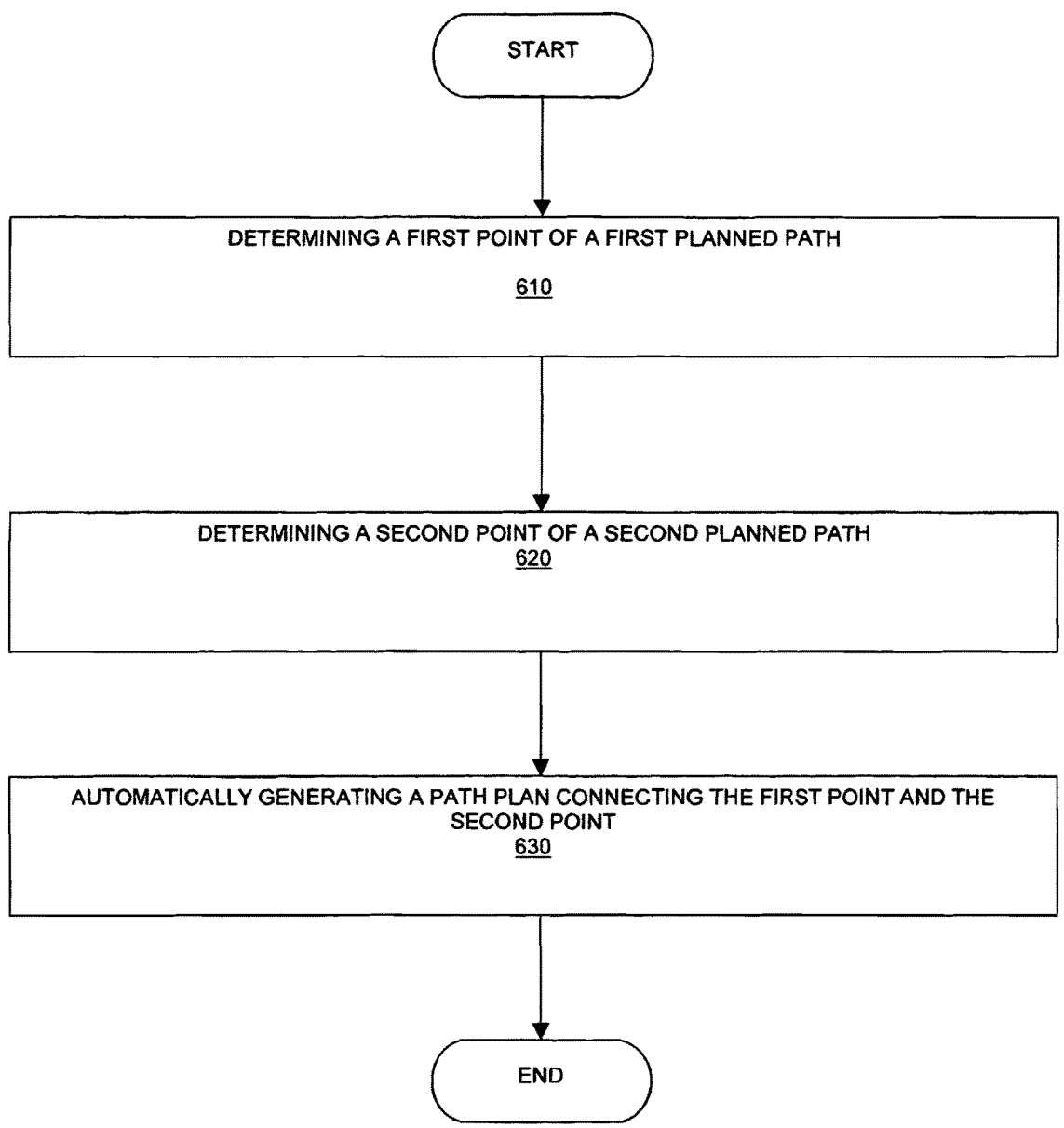

METHOD AND SYSTEM FOR PLANNING THE PATH OF AN AGRICULTURAL VEHICLE

TECHNICAL FIELD

The present invention relates to planning the path of an agricultural vehicle. However, the invention is not limited to use in agriculture, but includes such other applications as may be apparent to one skilled in the art.

BACKGROUND

Operating agricultural vehicle such as tractors and harvesters often requires highly repetitive operations. Due to the repetitive nature of the work, and irregularities in the terrain, gaps and overlaps in the rows of crops can occur. This can result in damaged crops, overplanting, or reduced yield per acre. Additionally, it is often desirable for a vehicle to follow a set path pattern over an area, for example when planting a field, conducting a search, or to reproduce a previously created path pattern at a later date. For example, a field may be ploughed, then sowed or planted, fertilized, sprayed and harvested. Following the same path pattern over the field each time ensures that each subsequent action is targeted to the correct area. It is therefore advantageous to pre-plan the paths that a vehicle will follow. As the size of agricultural vehicles and farming implements continues to increase, precisely controlling their motion becomes more important.

Guidance systems are increasingly used for controlling agricultural and environmental management equipment and operations such as road side spraying, road salting, and snow plowing where following a previously defined route is desirable. This allows more precise control of the vehicles than is typically realized than if the vehicle is steered by a human.

Projected paths may be used to guide a vehicle directly, or transmitted to an on-board display to be followed by a human operator. Systems of course-correction may be used to minimize cross-track and offset if the vehicle deviates from a pre-projected path. Gain tuning may also be applied to the auto-steering system in order to approximate the differences in human steering when the vehicle is traveling at different speeds.

There exist current systems for pre-planning the path of a vehicle. However, the produced set of paths are often disjointed. Typically, at the end of each path, a driver must disengage the auto-drive, manually direct the vehicle to the next path to be driven and line up the vehicle with the new path.

Known methods of steering an agricultural vehicle may include selecting a desired position and heading and calculating a desired radius of curvature to arrive at the desired track with a desired heading. This system is real time feedback system, which takes into account the contours of the surface and continually corrects the course of the vehicle.

Another method is to use a vision based system of automated vehicle steering. An electromagnetic sensor is used to gather information about field characteristics, and plan a trajectory. This includes determining points in the path matrix the vehicle will be guided towards and determining the desired wheel angle required such that the vehicle origin will pass through that point, given the vehicle's position relative to that point and the turning radius.

It is also known to pre-determine entrance points and advance points on a pre-planned path, but the means of planning an appropriate path between points on a pre-planned path or set of paths has not been discussed.

DISCLOSURE OF THE INVENTION

Embodiments of the present invention pertain to methods and systems for planning the path of an agricultural vehicle. In one embodiment, a first point of a first planned path and a second point of a second planned path are determined. A path plan is then automatically generated connecting the first point and the second point.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 3 is a flow chart showing one implementation of a method of determining the path of a mobile machine in accordance with embodiments of the present invention.

FIG. 6 is a flowchart of a method for planning the path of an agricultural vehicle in accordance with embodiments of the present invention.

BEST MODE FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "amending," "utilizing," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
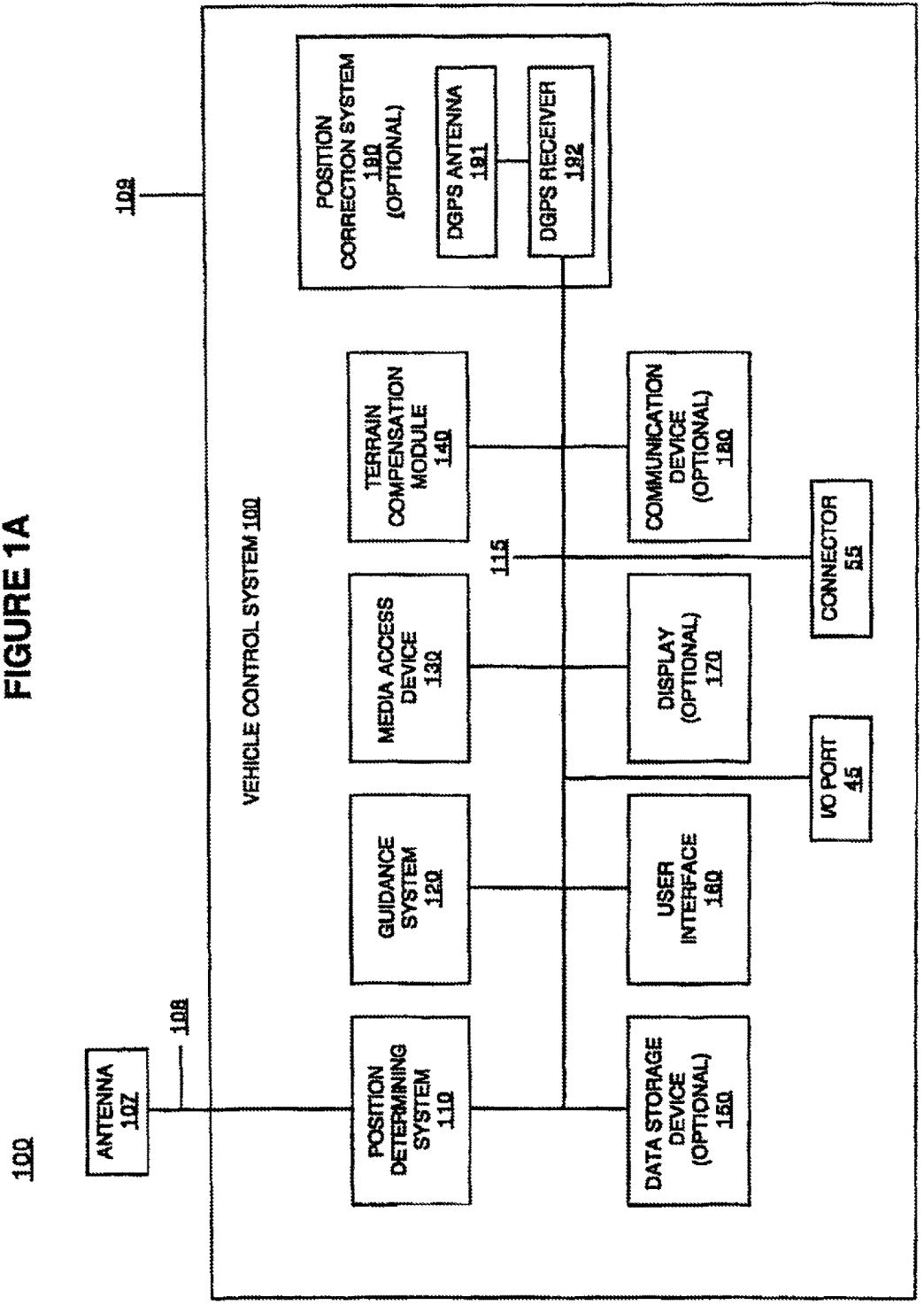
FIGS. 1A and 1B show an exemplary vehicle control system in accordance with embodiments of the present invention.
Figure 1B:
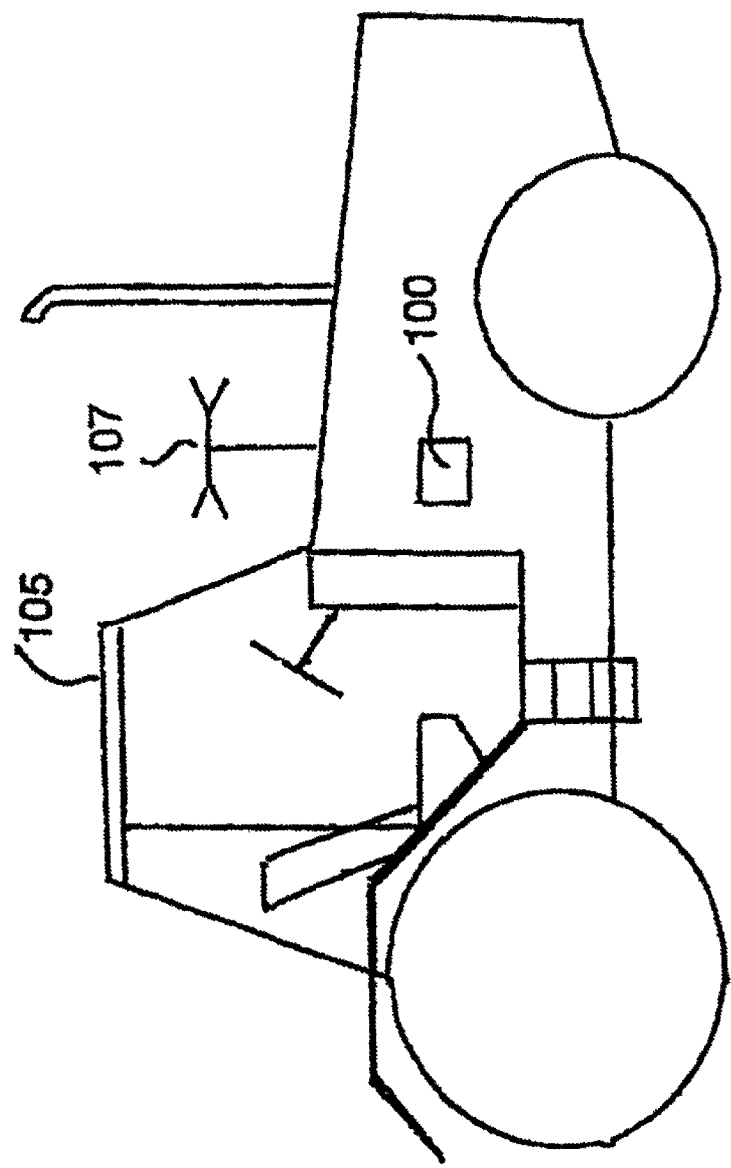

FIG. 1A illustrates a block diagram of a vehicle control system 100 in accordance with an embodiment of the present invention. In embodiments of the present invention, the vehicle control system 100 may be implemented as an integrated guidance system that can be mounted on the dashboard, windshield, or ceiling of a vehicle such as, a tractor. In one embodiment, vehicle control system 100 is integrated with a steering component (e.g., 230 of FIG. 2A) which may be coupled with the steering column or steering shaft of the mobile machine (e.g., 105 of FIG. 1B) being controlled and is operable for actuating the steering mechanism thereof. In other embodiments of the present invention, vehicle control system 100 may be implemented as a plurality of discrete components which are communicatively coupled in a network.

In accordance with embodiments of the present invention, vehicle control system 100 determines the geographic position of a vehicle or other mobile machine and determines whether the vehicle is traveling in a desired direction. Additionally, if the vehicle is not traveling in a desired direction, vehicle control system 100 determines a course correction for the vehicle and generates a steering command to implement the course correction. For the purposes of the present invention, the term "geographic position" means the determining in at least two dimensions (e.g., latitude and longitude), the location of a mobile machine (e.g., 105). Furthermore, for purposes of the present invention, the term "course correction" means a change in the direction traveled by the vehicle such that it is guided from a current direction of travel to a desired direction of travel.

Embodiments of the present invention facilitate controlling the steering of mobile machines, thus allowing more precise control of the machine than may be realized by a human operator under certain conditions. For example, a snowplow may operate under conditions in which a human operator's ability to see the road is diminished. Additionally, when performing highly repetitive tasks such as plowing a field, embodiments of the present invention facilitate controlling the vehicle more precisely, thus minimizing errors in controlling the vehicle which may result in gaps or overlaps in the field. Embodiments of the present invention are also well suited for reproducing a previously created path pattern at a later date. Furthermore, embodiments of the present invention are well suited for planning and guiding the path of the mobile machine such that sharp turns are eliminated from the planned path of the mobile machine in a reliable and repeatable manner.

Again, it should be understood that vehicle control system 100 of the present invention can be utilized with a variety of mechanical systems that are capable of movement. Although the present discussion will focus on guidance of vehicles such as, for example, agricultural vehicles and equipment, the invention is not limited to the guidance and use on agricultural vehicles alone.

Referring again to FIG. 1A, the vehicle control system 100 includes a position determining system (PDS) 110, a guidance system 120, and a media access device 130 which are coupled via a bus 115. Additionally, a terrain compensation module (TCM) 140, an optional data storage device 150, and a user interface 160 are coupled with bus 115. Also, an optional display 170, an optional communication device 180, and an optional position correction system 190 are coupled with bus 115. In the embodiment of FIG. 1A, these components are disposed within a housing 109. Input/output (I/O) port 45 and connector 55 facilitate communicatively coupling vehicle control system 100 with other components such as the steering component described above (e.g. 230 of FIG. 2A). While the present embodiment shows these components disposed within housing 109, embodiments of the present invention are well suited to various combinations of these components. For example, in one embodiment, position determining system 110 and terrain compensation module 140 may be disposed within a housing (not shown) of antenna 107. In other embodiments of the present invention, vehicle control system 100 may be implemented as a plurality of discreet components which are communicatively coupled in a networked devices.

In one embodiment of the present invention, position determining system 110 is a satellite based position determining system and receives navigation data from satellites via antenna 107. Examples of satellite based position determining systems include the global positioning system (GPS) navigation system, a differential GPS system, a real-time kinematics (RTK) system, a networked RTK system, etc. While the present embodiment recites these position determining systems specifically, it is appreciated that embodiments of the present invention are well suited for using other position determining systems as well such as ground-based position determining systems, or other satellite-based position determining systems such as the GLONASS system, the Global Navigation Satellite System (GNSS), the Radionavigation Satellite Service (RNSS), or the Galileo system currently under development.

In the embodiment of FIG. 1A, position determining system 110 utilizes a process of triangulation from several satellites, which are transmitting position determination signals, to determine the current position of the vehicle. The position determining system 110 is coupled with antenna 107 via a coupling 108. As shown in FIG. 1A, antenna 107 is disposed outside of housing 109 to facilitate mounting antenna 107 outside of the vehicle (e.g., mounted on the hood or roof of mobile machine 105) if, for example, the received GPS signals from the GPS satellites are not be strong enough inside the vehicle. However, in embodiments of the present invention, antenna 107 may also be disposed within housing 109. It should be understood that the position determining system 110 can be implemented to utilize position determination signals from other satellite-based systems, land-based systems, or hybrid (satellite-land) systems as well.

The accuracy of the current position of the vehicle determined by the position determining system 110 depends on factors such as time of the day, number of GPS satellites available, atmospheric conditions, accuracy of the components, etc. These factors can introduce errors in the determination of the current position of the vehicle.

A process known as differential correction can correct many of these errors. Differential GPS is an enhanced form of GPS. Differential GPS positions are more accurate than regular GPS positions. Differential GPS positions are regular GPS positions that have been corrected for atmospheric conditions and/or other errors using the process of differential correction. Typically, differential correction uses a GPS reference station, such as a GPS station that has a well-known location, to provide corrections for other GPS receivers that are at unknown locations (such as on a vehicle). Differential corrections may be applied second-by-second in real time. These are known as real-time differential corrections. Alternatively, differential corrections may also be stored in electronic files (e.g., in data storage device 150) and accessed later.

There are many sources of differential corrections. These sources include a short-range radio link from a local GPS reference station, a medium-range radio link from maritime or land-based beacons, and geo-stationary satellites. Geo-stationary satellites use multiple land-based reference stations to create a differential correction map over very large areas of the earth. One of these systems is the Wide Area Augmentation System (WAAS).

In an embodiment of the present invention, differential correction capability is integrated into the position determining system 110 of FIG. 1A. In the embodiment shown in FIG. 1A, the optional position correction system 190 provides the differential correction capability. As described above in an embodiment of the present invention, the position determining system 110 utilizes satellites of the Global Positioning System. Thus, the position correction system 190 includes a Differential Global Positioning System (DGPS) receiver 192 for correcting errors in the GPS position using GPS differential corrections, a DGPS antenna 191 for receiving GPS differential correction signals. In embodiments of the present invention, DGPS antenna 191 and DGPS receiver 192 may be coupled via a cable to facilitate positioning DGPS antenna 191 outside of the vehicle or, as shown in FIG. 1A, disposed within housing 109.

As will be discussed in greater detail below, guidance system 120 uses position data from position determining system 110, user input (e.g., a desired pattern or direction), as well as vector data such as desired direction and distance to determine course corrections which are used for guiding mobile machine 105. Furthermore, guidance system 120 is further for reproducing a previously created path pattern at a later time and for planning a path for mobile machine 105 that is contiguous, and which is both repeatable and reliable.

In embodiments of the present invention, media access device 130 facilitates accessing data from removable media storage devices. Examples of removable media storage devices accessible in accordance with embodiments of the present invention include, but are not limited to, floppy disks, optical media storage devices (e.g., compact disks (CDs) and digital versatile disks (DVDs), and flash memory devices such as Secure Digital Input/Output (SDIO) cards, CompactFlash memory devices, MultiMediaCard memory devices, SmartMedia memory devices, or other integrated circuit memory devices. More generally, media access device 130 is for accessing digital data stored on a removable media storage device.

TCM 140 provides the ability to compensate for terrain variations which can reduce the precision of position determining system 110 in determining the geographic position of a vehicle. For example, when traversing a hillside, the antenna 107 can be displaced to one side or the other with respect to the centre line of mobile machine 105, thus causing errors in determining its geographic position. As a result, gaps or overlaps can occur when plowing across contoured terrain is being performed. TCM 140 can detect the magnitude of displacement of antenna 107 with respect to the centre line of mobile machine 105 (e.g., due to roll, pitch, and yaw) and send signals which allow guidance system 120 to generate steering commands which compensate for the errors in determining the geographic position. In embodiments of the present invention, TCM 140 may utilize gyroscopes, accelerometers, tilt sensors, rotation sensors, and the like to determine the displacement of antenna 107 from a first position to a second position with respect to the centerline of mobile machine 105.

Because vehicle control system 100 may be coupled with a vehicle using, for example, suction cups, it may be beneficial to calibrate TCM 140 prior to operating system 100. For example, if vehicle control system 100 is tilted when the system is started up, a bias may be induced which prevents TCM 140 from accurately determining the offset of antenna 107 from the centerline of the vehicle. In one embodiment, a circular level may be fixedly mounted in the vehicle in a location which can be seen by the vehicle operator. The vehicle can be parked at a level area and the circular level adjusted to indicate that the vehicle is level. The mounting hardware for the circular level can then be tightened to prevent the circular level from being tilted. A second circular level can be mounted on vehicle control system 100. When the circular level in the vehicle shows that the vehicle is parked in a level area, a user can manually change the mounting angle of vehicle control system 100 so that the circular level mounted thereupon indicates that the integrated guidance system is also level.

In another embodiment, the levels indicate the magnitude of the tilt of the vehicle of the vehicle control system 100. When the level mounted in the vehicle indicates, for example, a tilt of five degrees to the left, the vehicle operator can tilt integrated guidance system five degrees to the left as well. As a result, both the vehicle and vehicle control system 100 are tilted in a similar direction and magnitude.

In another embodiment, an electronic auto-level (not shown) may be coupled or built into vehicle control system 100 which automatically removes bias induced by the mounting angle of vehicle control system 100. To check whether tilt-induced bias has been removed, an operator can drive the vehicle over the same ground in opposite directions. If there is no tilt-induced bias, the wheels of the vehicle should substantially traverse the same wheel tracks as in the previous pass. If there is a mis-alignment of vehicle control system 100 due to tilt, antenna 107 will not be in the expected position. As a result, the vehicle will follow different paths when successive passes are made across the same ground.

In embodiments of the present invention, optional data storage device 150 may comprise a volatile memory random access memory (RAM) for storing the digital information and instructions, or non-volatile data storage device such as a hard disk drive, flash memory or other optical or magnetic storage device. Data storage device 150 can be used to store digital information and instructions such as the curve smoothing method of the present invention. It should be noted that the software program for implementing the path planning method of the present invention can also be stored in removable media storage devices accessible by media access device 130. In embodiments of the present invention, data storage device 150 may be remotely located from vehicle control system 100. For example, communication device 180 may be a radio transceiver or cellular telephone device which can wirelessly transmit data from vehicle control system 100 to a remotely located data storage device 150 (e.g., via the Internet).

In embodiments of the present invention, data storage device 150 may also be used to log or record information such as field boundaries, road pathways, or where the vehicle has previously gone. This last function is particularly useful because records must be kept regarding the application of chemicals or fertilizers to, for example, farm fields in order to comply with environmental regulations. Embodiments of the present invention facilitate logging this information for later retrieval.

In embodiments of the present invention, the user interface 160 is adapted for enabling an operator to access and interact with any one of the available functions of the vehicle control system 100 with a minimum number of inputs and with minimum use of the inputs. An "input" refers to a button, key, switch, or any other electronic or mechanical means for a user to communicate information such as, for example, data, a command, a selection or a choice, to an electronic device. In an embodiment, the user interface 160 may comprise a plurality of buttons. In another embodiment, user interface 160 may comprise an alpha-numeric keypad and/or a device for controlling a cursor displayed upon display device 170. Examples of cursor control devices include, but are not limited to, a trackball, mouse, touch pad, joystick, or special keys on the alpha-numeric keypad. In other embodiments, a voice recognition system (not shown) may be used to facilitate input of commands without requiring a user to operate user interface with his/her hands.

In embodiments of the present invention, user interface 160 is conveniently positioned and integrated with respect to housing 109 for easy access by an operator. As a result, an operator can use without difficulty the vehicle control system 100 while operating the vehicle, since distractions (e.g., too many inputs to select, position of the inputs is not convenient, need for visual assistance to distinguish inputs, etc.) originating from using the user interface by other guidance systems are significantly reduced.

In embodiments of the present invention, display 170 comprises a display device for displaying text and graphics. In an embodiment, the display device 170 may be, but is not limited to, a liquid crystal display (LCD). In another embodiment, display 170 may comprise a touch panel display (e.g., using resistive, capacitive, inductive, or pressure sensitive input detection) to facilitate input of data such as user touch screen commands. The display device 170 can be implemented with other display technologies. Moreover, the display device 170 is compact to minimize obstructing the vision of the operator and to reduce the size of the vehicle control system 100.

In embodiments of the present invention, display device 170 may generate a lightbar display that is adapted for providing a visual representation of a deviation of the current position of the vehicle from a desired path to guide an operator in controlling movement of the vehicle along the desired path. Typically, the lightbar comprises a light pattern that indicates the deviation of the vehicle from the desired path. It should be understood that in embodiments of the present invention, the lightbar may be implemented as a plurality of discreet light emitting elements that are separate from display device 170.

In embodiments of the present invention, vehicle control system 100 can be coupled with steering component 230 via the I/O port 45. Moreover, vehicle control system 100 can have one or more I/O ports 45, thus facilitating the downloading and uploading of data. In an embodiment, the I/O port 45 is a serial port which is compliant with, but not limited to, the controller area network (CAN) protocol. CAN is a serial bus system which was developed for automotive use in the early 1980s. The Society of Automotive Engineers (SAE) has developed a standard CAN protocol, SAE J1939, based upon CAN specification 2.0. The SAE J1939 specification provides plug-and-play capabilities and allows components from various suppliers to be easily integrated in an open architecture. It is noted that in embodiments of the present invention, discreet components of vehicle control system 100 may be communicatively coupled using a CAN bus. For example, position determining system 110, guidance system 120, and steering component 230 may be communicatively coupled using a CAN bus in embodiments of the present invention. It is appreciated that other discreet components of vehicle control system 100 may also be coupled using the CAN bus as well.

In the embodiment of FIG. 1A, connector 55 is for conveying electrical power from mobile machine 105 to vehicle control system 100. However, it is appreciated that in another embodiment, vehicle control system may be powered by internal batteries (not shown).

Figure 2A:
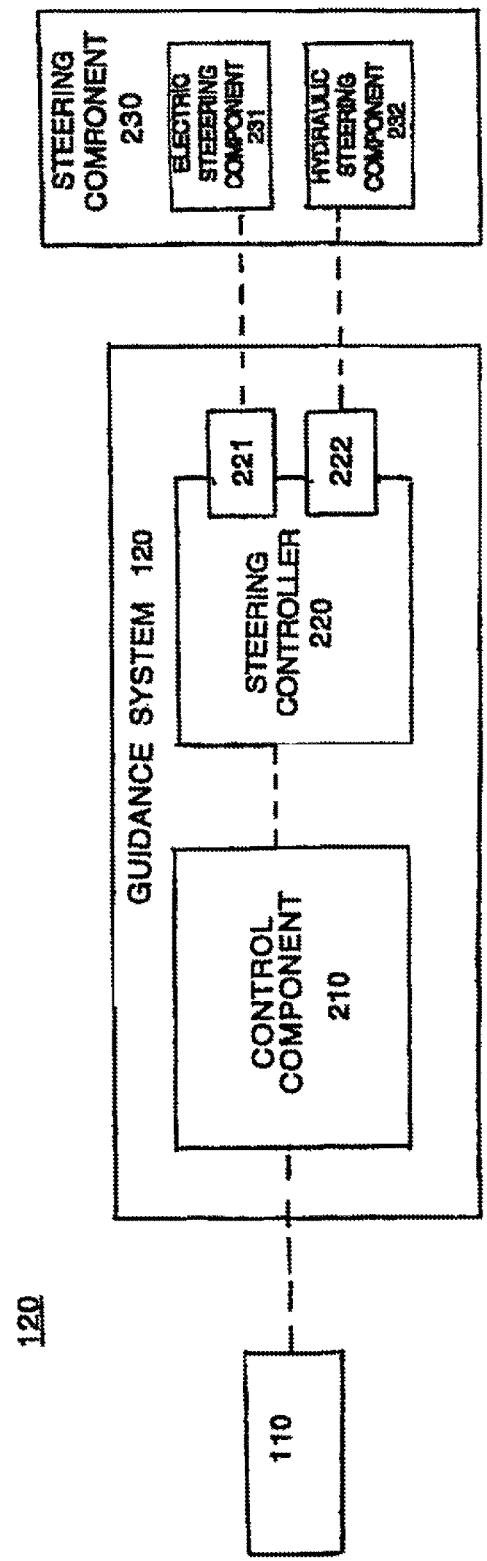
FIG. 2A is a block diagram of an exemplary guidance system in accordance with embodiments of the present invention.

FIG. 2A is a block diagram of an exemplary guidance system 120 in accordance with embodiments of the present invention. In the embodiment of FIG. 2A, guidance system 120 comprises a control component 210 which is coupled with an optional steering controller 220. It is appreciated that in embodiments of the present invention, control component 210 may be implemented as a single unit separate from steering controller 220, or as an integrated unit as shown in FIG. 2A.

In embodiments of the present invention, control component 210 accesses position data from position determining system 110, user input such as a desired pattern or direction, as well as vector data such as desired direction and distance to determine course corrections which are used for guiding mobile machine 105. In embodiments of the present invention, roll, pitch, and yaw data from TCM 140 may also be used to determine course corrections for mobile machine 105. In embodiments of the present invention, guidance system 120 is a commercially available guidance system such as, for example, the AgGPS® guidance system, or the EZ-Guide® system, both of which are manufactured by Trimble Navigation Ltd. of Sunnyvale Calif.

Additional data used to determine course corrections may also comprise swath calculation which takes into account the width of various implements which may be coupled with mobile machine 105. For example, if a harvester can clear a swath of 15 feet in each pass, control component 210 may generate commands which cause mobile machine 105 to follow a path 15 feet to one side of the preceding swath in the next pass. Control component 210 may also be programmed to follow straight or curved paths which is useful when operating in irregularly shaped or contoured fields or in fields disposed around a centre pivot. This is also useful in situations in which the path being followed by mobile machine 105 is obscured. For example, an operator of a snowplow may not be able to see the road being cleared due to the accumulation of snow on the road. Additionally, visibility may be obscured by dust, snow, rain, or fog. Thus, it would be advantageous to utilize embodiments of the present invention to guide mobile machine 105 in these conditions.

In embodiments of the present invention, the course correction calculated by control component 210 is sent from control component 210 to steering controller 220. Steering controller 220 translates the course correction generated by control component 210 into a steering command for manipulating the steering mechanism of mobile machine 105. Steering controller 220 generates a message conveying the steering command to steering component 230. In embodiments of the present invention, the communicative coupling between control component 210, steering controller 220 and steering component 230 is accomplished using coupling I/O port 42 (e.g., a serial bus, or CAN bus).

In embodiments of the present invention, steering component 230 may comprise an electric steering component 231, or a hydraulic steering component 232. Thus, as shown in FIG. 2A, steering controller 220 comprises a first output 221 for coupling steering controller 220 with electric steering component 231, and a second output 222 for coupling steering controller 220 with hydraulic steering component 232. Because coupling 115 may be compliant with the CAN protocol, plug and play functionality is facilitated in guidance system 120. Therefore, in embodiments of the present invention, steering controller can determine which steering component it is coupled with depending upon which output of steering controller 220 is used.

Steering controller 220 then generates a message, based upon the steering component with which it is coupled, which causes the steering component to actuate the steering mechanism of mobile machine 105. For example, if steering controller 220 determines that output 221 is being used, it generates a steering command which is formatted for controlling electric steering component 231. If steering controller 220 determines that output 222 is being used, it generates a steering command which is formatted for controlling hydraulic steering component 232.

Figure 2B:
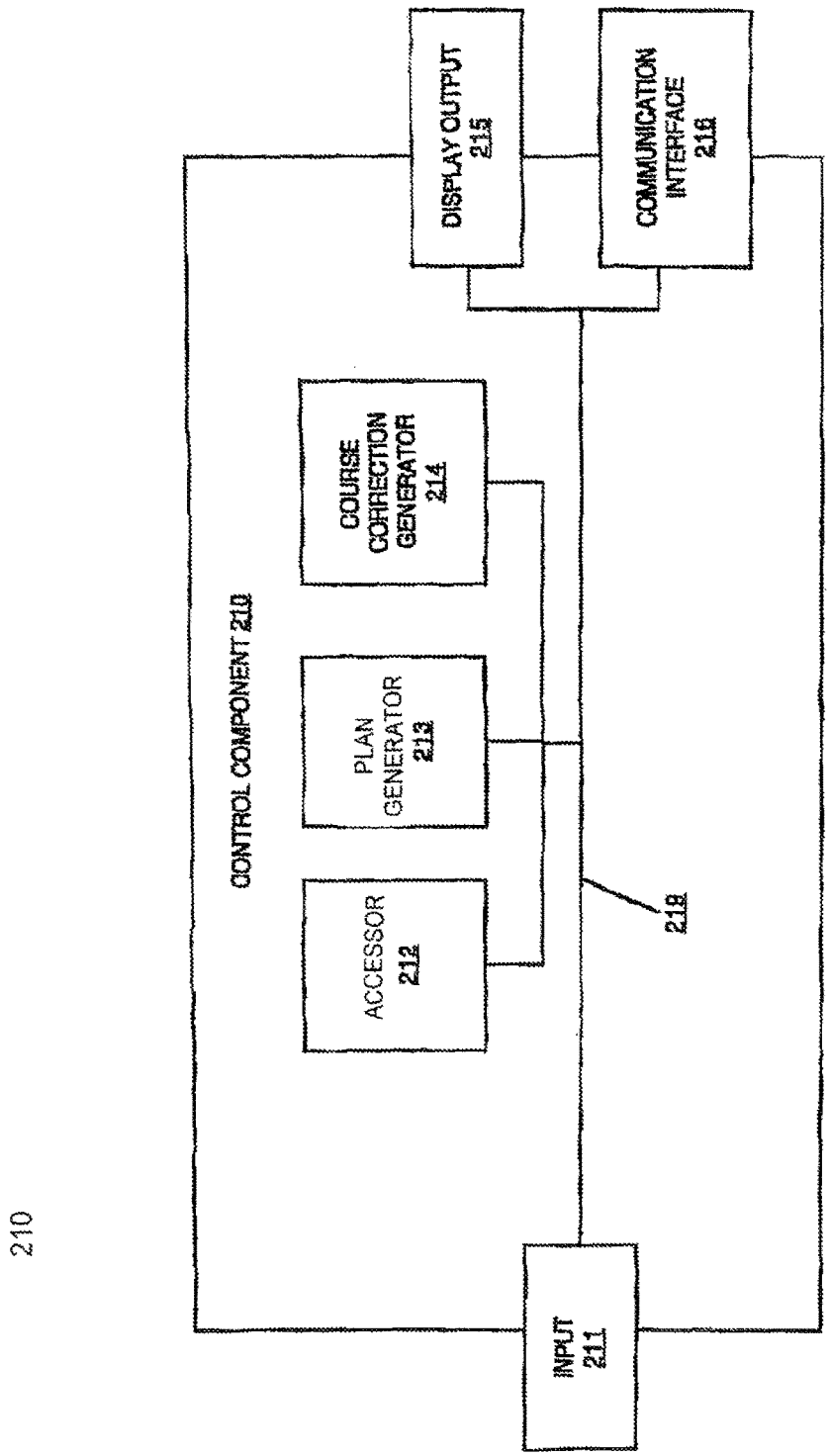
FIG. 2B is a block diagram of an exemplary control component in accordance with embodiments of the present invention.

FIG. 2B is a block diagram of an exemplary control component 210 in accordance with embodiments of the present invention. In FIG. 2B, control component 210 comprises an input 211 which is coupled with an accessor 212, a path plan generator 213, and a course correction generator 214 via a bus 219. A display output 215 and a communication interface 216 are also coupled with bus 219. In embodiments of the present invention, input 211 is communicatively coupled with bus 115 of FIG. 1A. Thus, control component 210 may directly access geographic position data generated by position determining component 110 via input 211.

In embodiments of the present invention, a plurality of planned paths are accessed via input 211 by accessor 212. It is noted that the planned path accessed by control component 210 may be input into system 100 by a user, or previously stored data accessed via data storage device 150, media access device 130, or transmitted via communication device 180. Path plan generator 213 then assigns a sequence to the plurality of planned paths. Again, this may be in response to user input, or performed automatically by path plan generator in embodiments of the present invention. A first point lying on a first planned path is determined and a second point lying on the next planned path, or second planned path, in the sequence. In embodiments of the present invention, path plan generator 213 then automatically calculates a path plan which connects a point of the first planned path with a point of a second planned path of the plurality of planned paths. In a preferred embodiment system 100 is adapted to plan turns between planned swath paths for an agricultural field. More specifically, path plan generator 213 determines the geographic position of the end point of the first planned path, the geographic position of the start point of the second planned path, and generates a path plan which connects those two points.

In embodiments of the present invention, path plan generator 213 may select a shape for the generated path plan from a plurality of pre-planned path plan shapes. This may be performed automatically by path plan generator 213 or in response to a user selection. In embodiments of the present invention, path plan shapes which may be selected by path plan generator 213 may comprise, but are not limited to, a semi-circle (e.g., 508 of FIG. 5) and a keyhole shape (e.g., 408 of FIG. 4). Additionally, path plan generator 213 may access other data when selecting a path plan shape. For example, path plan generator may access swath data and data indicating the turning radius of mobile machine 105, including towed implements coupled thereto, when selecting a path plan. Thus, if the turning radius of mobile machine 105 would be exceeded by selecting a semi-circular path plan between successive planned paths, path plan generator 213 may instead automatically select a keyhole shaped path plan. In embodiments of the present invention, this may override a user selected path plan if safe operating parameters of mobile machine 105 are to be exceeded.

In embodiments of the present invention, upon generating a path plan for mobile machine 105, course correction generator 214 may generate a course correction which is conveyed to steering controller 220 via communication interface 216. As described above, embodiments of the present invention may be utilized for causing mobile machine 105 to automatically follow the path plan. Steering controller 220 then generates signals or messages to steering component 230 which actuate the steering mechanism of mobile machine 105 and cause it to automatically follow the path plan generated by path plan generator 213. In embodiments of the present invention, control component 210 may access position data via position determining system 110 to determine whether mobile machine 105 is or is not deviating from the path plan generated by path plan generator 213.

In another embodiment, mobile machine 105 may not be equipped with automatic steering control equipment (e.g., steering controller 220 and steering component 230). Thus, in embodiments of the present invention, a visual indication may be sent from control component 210 via display output 215 to display 170 of FIG. 1A. As described above, display 170 may provide an operator with a visual indication of a deviation of mobile machine 105 from a desired direction. In embodiments of the present invention, a lightbar may indicate the direction of deviation from the planned path generated by path plan generator 213, or be used to indicate which direction to steer toward in order to again be driving on the planned path. In another embodiment, this information may be displayed on a display screen (e.g., a liquid crystal display device of display 170). It is noted that the function of components described above may be combined in a single functional module such as a dedicated processor of control component 210.

The path plan determined by embodiments of the present invention may be stored for later use. Thus, embodiments of the present invention facilitate reliable reproduction of previously created routes and paths which can be used as navigation aids for operators of mobile machine 105.

In embodiments of the present invention, vehicle guidance system 120 may comprise control component 210 alone. Thus, in one embodiment, steering cues may be displayed to an operator of mobile machine 105. For example, a lightbar display (e.g., 170 of FIG. 1A) may provide a visual representation of a deviation of the current position of mobile machine 105 from a desired direction. Using this information, the operator can then affect a course correction for mobile machine 105 to reduce the deviation from the desired direction.

In another embodiment, guidance system 120 further comprises steering controller 220 which is operable for generating signals that control the steering mechanism of mobile machine 105. Based upon steering commands generated by control component 210, steering controller 220 generates signals that actuate the steering mechanism of mobile machine 105 to implement course corrections automatically.

Referring to FIG. 3, at step 301 a series of planned paths are accessed by system 100. As described above, in embodiments of the present invention the paths may comprise digitally created or stored geographic data. These paths may be paths that have been recorded on previous passes of the vehicle using the navigation device, manually estimated paths or paths generated using a path planning system. Ideally the system is integrated into a known path planning system, which generates the paths, and then proceeds with the additional steps of the invention (i.e. the projected paths are "auto-input"). In another embodiment, a user may manually input the series of planned paths using, for example, user interface 160.

At step 302 the sequence in which the paths are to be driven is assigned. This may be a sequential order from left to right, a "race-course" pattern following alternate paths from left to right, then returning from right to left by the paths previously missed, or any other pattern selected by the user. In embodiments of the present invention, the sequence of planned paths may be assigned by path plan generator 213. For example, when accessing previously stored data, path plan generator 213 may not require that the user manually selects the sequence in which the paths are to be driven. In another embodiment, the sequence may be input by a user of system 100.

At step 303 a desired turn path shape for the vehicle to follow between paths is selected. As a default setting, the system may automatically select one desired turn path shape, e.g. a keyhole shape. However, the user may have the option to manually select a desired turn shape, which may be, for example, an arc of a circle or part of another conic section, a "keyhole" shape, or a combination of curves. Additionally, the desired shape may also be selected based upon the distance between the successive paths to be driven by mobile machine 105 and/or the turning radius of mobile machine 105.

At step 304 a first point, which lies on a first planned path, is determined. This is the point at which the turn will commence. The first point may be set in advance by a user, or may be entered in real time as the vehicle moves down the first planned path by pressing a "turn now" button. In another embodiment, path plan generator 213 may automatically determine the point at which the turn will commence. For example, when accessing previously recorded vehicle passes, path plan generator 213 may not require that the operator manually sets the first point.

At step 305 the system determines the location of a second point which lies on a second planned path (the next planned path in the order). Preferably this is the point on the second planned path which is closest to the first point. Again, in embodiments of the present invention, path plan generator 213 does not require that an operator manually sets the second point when, for example, accessing previously stored data.

At step 306, the system calculates a desired turn path shape which passes through both the first point and the second point. In embodiments of the present invention, calculation of a desired turn path shape may be based upon the turn radius of mobile machine 105. This is done using standard mathematical methods for determining the solution of a curve of known general formula passing though two known points.

At step 307, the system generates a path plan which follows the first planned path until it reaches the first point, then follows the curve generated at step 306 until it reaches the second point, then follows the second planned path.

At step 308 the path plan is output to a known auto-steer system or driver assistance interface as described in detail above. It is noted that embodiments of the present invention may be utilized to plan paths between adjacent paths (e.g., paths 401 and 402 of FIG. 4), or between non-adjacent paths (e.g., 501 and 503 of FIG. 5) depending upon user supplied parameters, or other parameters such as the turning radius of mobile machine 105. It is further noted that system 100 may be used to automatically steer mobile machine 105 along the plotted paths. For example, guidance system 120 may generate steering commands which cause mobile machine 105 to follow paths (e.g., 407, 408, and 411 of FIG. 4) without necessitating user intervention.

Example 1

Figure 4:
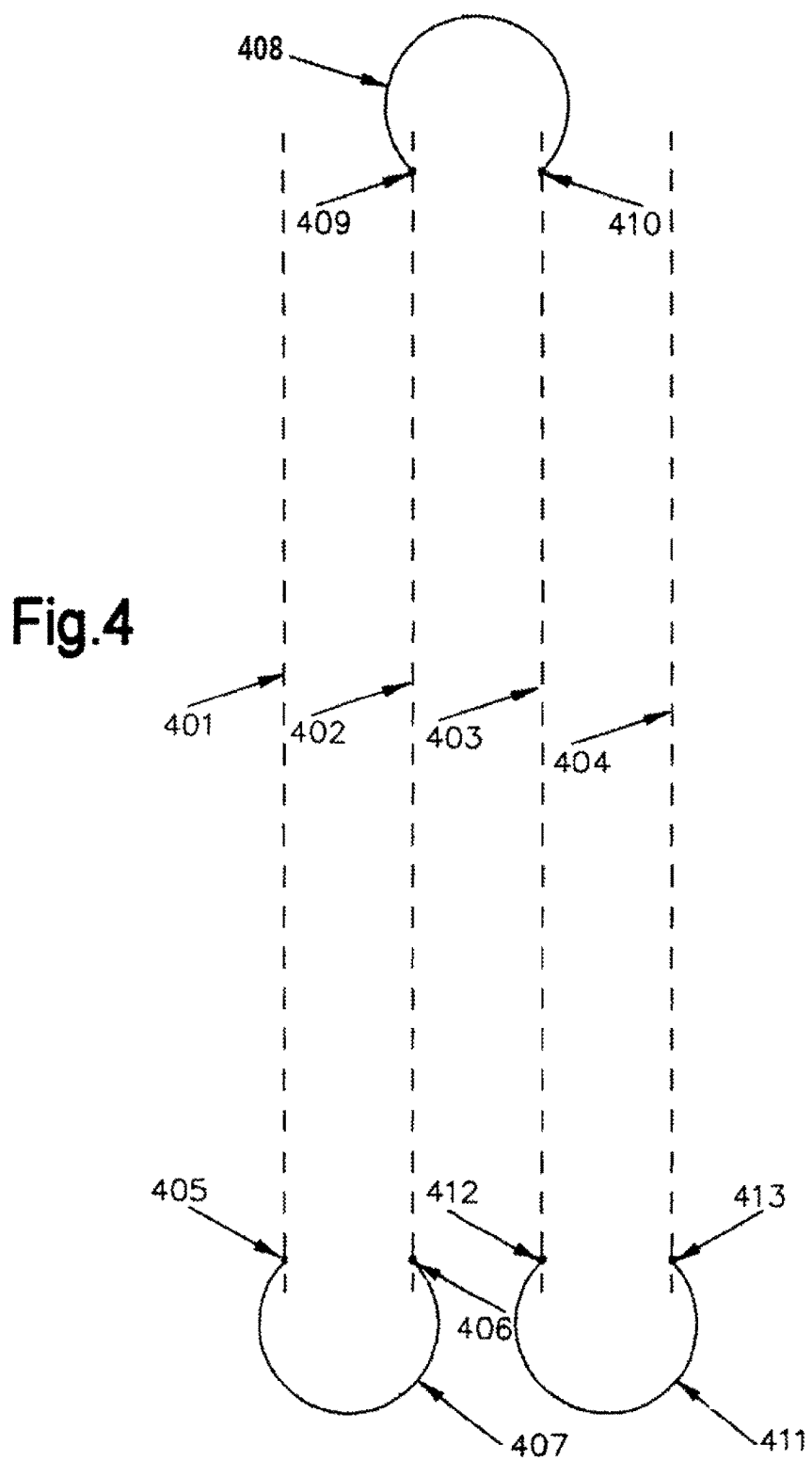
FIG. 4 shows a work area and a plurality of paths plotted in accordance with embodiments of the present invention.

Referring now to FIG. 4, system 100 is adapted to plan the turns between adjacent swaths along which an agricultural vehicle equipped with system 100 will traverse when, for example, plowing an agricultural field.

Referring to step 301 of FIG. 3 above, system 100 accesses a series of planned paths 401 to 404. As shown in FIG. 4, planned paths 401-404 comprise parallel paths. However, embodiments of the present invention are not limited to parallel paths alone. Additionally, the paths accessed by system 100 may comprise concentric contours or circles, a racecourse pattern, a headland pattern, or a combination thereof.

Referring to 302 of FIG. 3 above, the paths are assigned a sequential order. For example, path 401 will be the first path traveled, followed sequentially by paths 402, 403 and 404.

Referring to 303 of FIG. 3, a keyhole shape is selected as the desired turn path shape. In embodiments of the present invention, the general equation of the keyhole shape may be $(x-a)^2+(y-b)^2-r^2=0$, where x and y are Cartesian coordinates and r is the radius of the circle with centre at coordinates (a, b).

Referring to 304 of FIG. 3 above, a first point 405 near the end of first planned path 401 is determined.

Referring to 305 of FIG. 3, system 100 determines a second point 406 on second planned path 402. In one embodiment, system 100 uses standard mathematical techniques to determine the location of point 406, which is the point on second planned path 402 which lies closest to first point 405.

Referring to 306 of FIG. 3, system 100 uses standard mathematical techniques to calculate a curve 407 of the desired path shape, which passes through both first point 405 and second point 406.

The system may repeat steps 304 to 306 using planned path 402 as the first planned path and planned path 403 as the second projected path to generate curve 408 between points 409 and 410, and again using planned path 403 as the first planned path and planned path 404 as the second planned path to generate curve 411 between points 412 and 413.

Referring to 307 of FIG. 3, system 100 generates a path plan which follows planned path 401 until it reaches point 405, then follows curve 407 until it reaches point 406, follows planned path 402 until it reaches point 409, then follows curve 408 until it reaches point 410, follows planned path 403 until it reaches point 412, then follows curve 411 until it reaches point 413, then follows planned path 404.

Referring to 308 of FIG. 3, the path plan generated in step 307 is used by vehicle guidance system 120 to guide mobile machine 105 along the plotted paths.

Example 2

Figure 5:
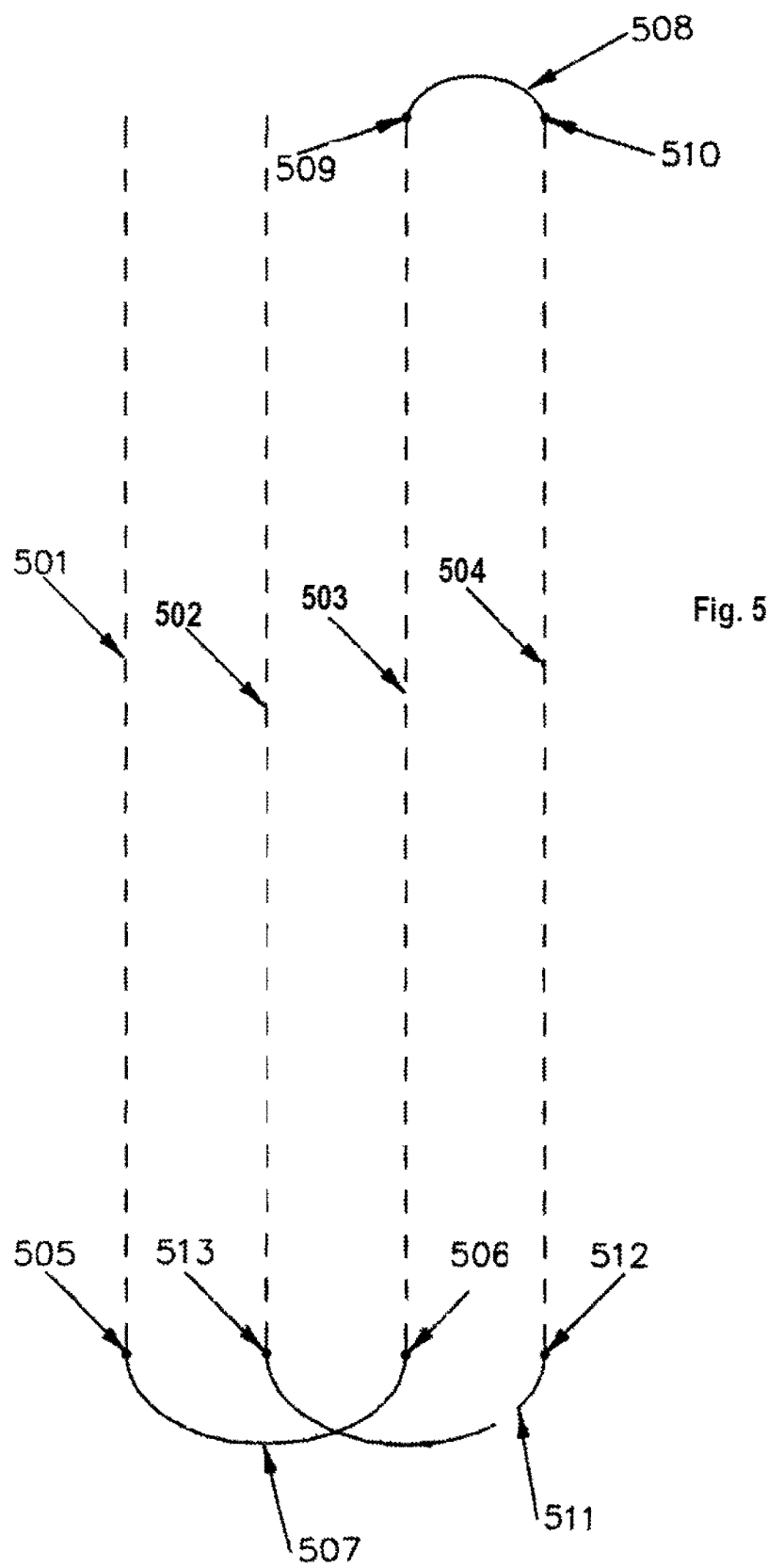
FIG. 5 shows another work area and a plurality of paths plotted in accordance with embodiments of the present invention.

Referring now to FIG. 5, system 100 is adapted to plan the turns between non-adjacent swaths along which an agricultural vehicle equipped with system 100 will traverse when, for example, plowing an agricultural field.

Referring again to step 301 of FIG. 3, system 100 accesses a series of planned paths 501 to 504.

Referring again to 302 of FIG. 3, the paths are assigned a sequence, i.e. 501, 503, 504, 502.

Referring again to step 303 of FIG. 3, a half ellipse is selected as the desired turn path shape. The general equation of the ellipse may be $b^2(x-h)^2+a^2(y-k)^2-a^2b^2=0$, where x and y are Cartesian coordinates, and a, b, h and k are constants.

Referring again to step 304 of FIG. 3, a first point 505 near the end of first planned path 501 is determined.

Referring again to step 305 of FIG. 3, system 100 uses standard mathematical techniques to determine the location of a second point 506, which is the point on second planned path 503 which lies closest to first point 505.

Referring again to step 306 of FIG. 3, system 100 uses standard mathematical techniques to calculate a curve 507 of the desired path shape, which passes through both first point 505 and second point 506.

The system may repeat steps 304 to 306 using planned path 503 as the first planned path and planned path 504 as the second planned path to generate curve 508 between points 509 and 510, and again using planned path 504 as the first planned path and planned path 502 as the second planned path to generate curve 511 between points 512 and 513.

At step 307, the system generates a path plan which follows planned path 501 until it reaches point 505, then follows curve 507 until it reaches point 506, follows planned path 503 until it reaches point 509, then follows curve 508 until it reaches point 510, follows planned path 504 until it reaches point 512, then follows curve 511 until it reaches point 513, then follows planned path 502.

Referring again to step 308 of FIG. 3, the path plan generated in step 307 is used by vehicle guidance system 120 to guide mobile machine 105 along the plotted paths.

FIG. 6 is a flowchart of a method 600 for planning the path of an agricultural vehicle in accordance with embodiments of the present invention. In step 610 of FIG. 6, a first point of a first planned path is determined. As described above with reference to FIG. 3, embodiments of the present invention can access a planned path and determine a first point of the planned path at which an agricultural vehicle will be turned.

In step 620 of FIG. 6, a second point of a second planned path is determined. As described with reference to FIG. 3, embodiments of the present invention may also access a second planned path and determine a second point of the second planned path to which the agricultural vehicle will be turned.

In step 630 of FIG. 6, a path plan connecting the first point and the second point is automatically generated. As described above with reference to FIG. 2A and FIG. 3, control component 210 can generate a path plan which connects the first point and the second point. In one embodiment, the generated path plan can be used by a vehicle guidance system to automatically steer the agricultural vehicle along the path plan without necessitating user input. In another embodiment, the path, or a deviation therefrom, may be displayed, thus permitting an operator of the agricultural vehicle to steer the vehicle along the path plan.

It should be noted that the descriptions given above are illustrative only, and do not restrict the scope of this invention, which is intended to include such modifications and variations as may be apparent to one skilled in the art. The preferred embodiment of the present invention, a method and system for planning the path of an agricultural vehicle, is thus described. While the present invention has been described in particular embodiments, it should be appreciated that the present invention should not be construed as limited by such embodiments, but rather construed according to the following claims.

What is claimed is:

1. A method for planning a path for an agricultural vehicle, the method comprising:
   accessing a first output of a steering controller, wherein the first output is associated with an electric steering component;
   accessing a second output of the steering controller, wherein the second output is associated with a hydraulic steering component;
   automatically detecting, by the steering controller, that the first output or the second output is in use;
   determining a single type of steering component based on an automatically detected output from the steering controller;
   accessing a recorded path plan, the recorded path plan comprising navigation data and roll, pitch, and yaw data recorded during a previous path passage of the agricultural vehicle through a work area using a position determining system and a terrain compensation module, wherein the roll, pitch, and yaw data are determined by the terrain compensation module for compensating errors in the navigation data as determined by the position determining system caused by terrain variation;
   determining a first point of a first planned path accessed from the recorded path plan, wherein the first point is determined in response to an indication received from an operator of the agricultural vehicle while the agricultural vehicle is on the first planned path;
   determining a second point of a second planned path accessed from the recorded path plan;
   automatically generating a revised path plan connecting the first point and the second point using the navigation data and the roll, pitch, and yaw data recorded during the previous path passage of the agricultural vehicle;

generating a steering command based on the revised path plan, wherein the steering command is formatted for the single type of steering component; and outputting the steering command to the single type of steering component via the output of the steering controller for actuating a steering mechanism of the agricultural vehicle to cause the agricultural vehicle to travel according to the revised path plan.

2. The method as recited in claim 1 further comprising:
assigning a sequence to the first planned path and the second planned path; and
selecting a path shape for connecting the first point and the second point in the revised path plan.

3. The method as recited in claim 1 wherein the automatically generating the revised path plan comprises selecting a path shape for connecting the first point and the second point from the group consisting of a semi-circle and a keyhole.

4. The method as recited in claim 1 further comprising:
determining a first geographic position of the first point and a second geographic position of the second point using the position determining system.

5. The method as recited in claim 4, wherein:
the position determining system is selected from the group consisting of a Global Navigation Satellite System (GNSS) and a terrestrial-based position determining system.

6. The method as recited in claim 4 further comprising:
displaying a deviation from the revised path plan on a display device.

7. A system for planning a path for an agricultural vehicle, the system comprising:
an accessor configured for accessing a recorded path plan, the recorded path plan comprising navigation data and roll, pitch, and yaw data recorded during a previous path passage of the agricultural vehicle through a work area using a position determining system and a terrain compensation module, wherein the roll, pitch, and yaw data are determined by the terrain compensation module for compensating errors in the navigation data as determined by the position determining system caused by terrain variation;
a steering controller communicatively coupled to a steering component of the agricultural vehicle, the steering controller further comprising:
a first output corresponding to an electric steering component;
a second output corresponding to a hydraulic steering component, and
wherein the steering controller is configured to automatically detect that the first output or the second output is in use and determine a single type of the steering component associated with an automatically detected output, the steering controller further configured to generate a steering command which is formatted for the single type of the steering component associated with the automatically detected output;
a guidance system configured for generating a revised path plan by connecting a first point of a first planned path accessed from the recorded path plan and a second point of a second planned path accessed from the recorded path plan using the navigation data and the roll, pitch, and yaw data recorded during the previous path passage of the agricultural vehicle, wherein the first point is determined in response to an indication received from an operator of the agricultural vehicle while the agricultural vehicle is on the first planned path, wherein the steering controller is configured to generate the steering command based on the revised path plan and to output the steering command to the steering component of the agricultural vehicle for actuating a steering mechanism of the agricultural vehicle to cause the agricultural vehicle to travel according to the revised path plan;
the position determining system coupled with the steering controller and the guidance system, the position determining system for determining geographic positions of the agricultural vehicle; and
the terrain compensation module coupled with the steering controller and the guidance system, the terrain compensation module configured to determine roll, pitch, and yaw of the agricultural vehicle for compensating errors in the geographic positions of the agricultural vehicle as determined by the position determining system caused by terrain variation.

8. The system of claim 7 wherein the guidance system is further configured for assigning a sequence to the first planned path and the second planned path and for selecting a path shape for connecting the first planned path and the second planned path in the revised path plan.

9. The system of claim 8 wherein the guidance system selects the path shape from the group consisting of a semi-circle and a keyhole.

10. The system of claim 7 wherein the position determining system is for determining a first geographic position of the first point and a second geographic position of the second point.

11. The system of claim 7 wherein the position determining system is selected from the group consisting of a Global Navigation Satellite System (GNSS) and a terrestrial-based position determining system.

12. The system of claim 7 further comprising:
a display device coupled with the guidance system for displaying a deviation of the agricultural vehicle from the revised path plan.

13. A control component for an agricultural vehicle, the control component comprising:
an accessor configured for accessing a recorded path plan which includes at least a first planned path and a second planned path, the recorded path plan comprising navigation data and roll, pitch, and yaw data recorded during previous path passage of the agricultural vehicle through a work area using a position determining system and a terrain compensation module, wherein the roll, pitch, and yaw data are determined by the terrain compensation module for compensating errors in the navigation data determined by the position determining system caused by terrain variation;
an output to a steering controller, the steering controller configured to access a first output corresponding to an electric steering component, access a second output corresponding to a hydraulic steering component, and automatically detect an output in use from the first output or the second output and determine a single type of a steering component that is coupled with the agricultural vehicle based on the output in use, the steering controller configured to generate a steering command which is formatted for controlling the steering component based on the output in use;
an input from the position determining system for determining a first geographic position corresponding to a point of the first planned path and a second geographic position corresponding to a point of the second planned path, wherein the point of the first planned path is determined in response to an indication received from an operator of the agricultural vehicle while the agricultural vehicle is on the first planned path; and a path plan generator configured for generating a revised path plan by connecting the first geographic position and the second geographic position using the navigation data and the roll, pitch, and yaw data recorded during the previous path passage of the agricultural vehicle, wherein the steering controller configured to generate the steering command based on the revised path plan and to output the steering command to the steering component of the agricultural vehicle for actuating a steering mechanism of the agricultural vehicle to cause the agricultural vehicle to travel according to the revised path plan.

14. The control component of claim 13 wherein the path plan generator is further configured to assign a sequence to the first planned path and the second planned path and to select a path shape for connecting the first geographic position and the second geographic position in the revised path plan.

15. The control component of claim 14 wherein the plan generator is configured to select the path shape from the group consisting of a semi-circle and a keyhole.

16. The control component of claim 13 further comprising an output to a display device for displaying a deviation of the agricultural vehicle from the revised path plan.

17. The control component of claim 13 wherein the position determining system is selected from the group consisting of a Global Navigation Satellite System (GNSS) and a terrestrial-based position determining system.

* * * * *